J. S. GRAY.
Gas Stove.
No. 41,697. Patented Feb. 23, 1864.
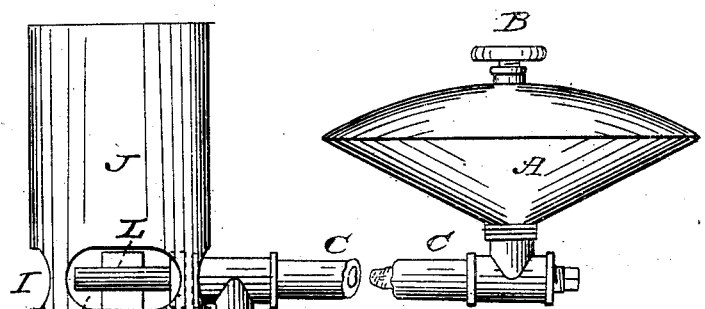
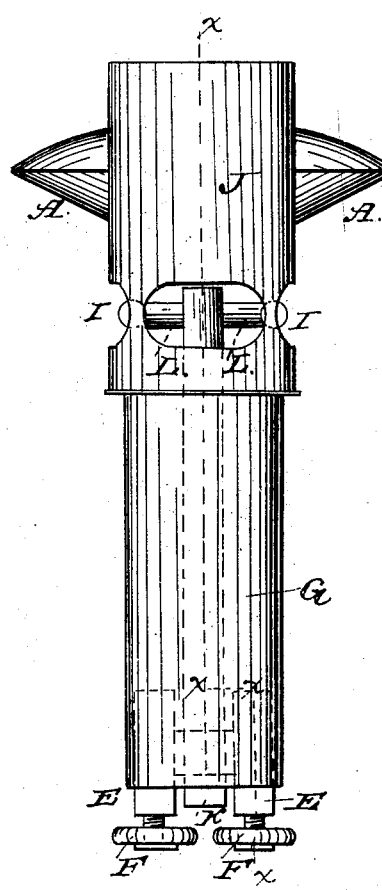
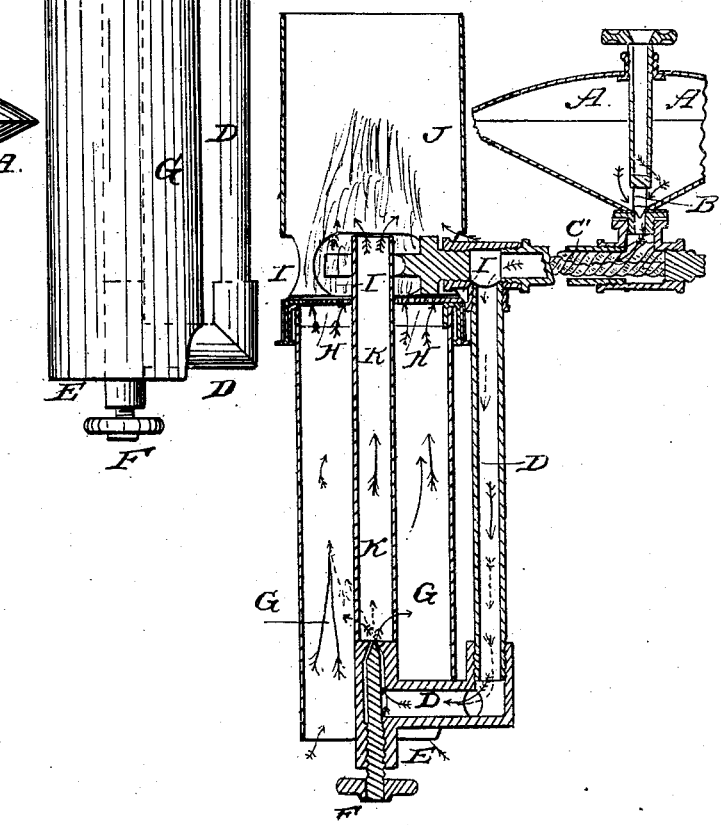

UNITED STATES PATENT OFFICE.

JAMES S. GRAY, OF NEW YORK, N. Y.

IMPROVEMENT IN GAS-STOVES.

Specification forming part of Letters Patent No. 41,697, dated February 23, 1864.

*To all whom it may concern:*

Be it known that I, JAMES S. GRAY, of the city, county, and State of New York, have invented a certain new and useful Improvement in Vapor-Stoves, of which the following is a full, clear, and exact description, reference being had to the accompanying drawings, which make part of this specification, and in which—

Figure 1 represents a view in elevation of so much of a vapor-stove embracing my improvement as is necessary to illustrate my invention. Fig. 2 represents a vertical section through the same at the line X X of Fig. 3; and Fig. 3 represents a view in elevation of the same, taken at right angles to that shown in Fig. 1.

It is the object of my invention to adapt a vapor-stove to the use of the heavier grades of naphtha, which require a great deal of oxygen to insure their proper combustion and to prevent them from smoking and tainting the articles to be cooked with their odors; and my improvements consist in certain devices for securing the proper heating and vaporization of the fluid, and the due admixture of oxygen, as hereinafter more fully described.

In the accompanying drawings a reservoir, A, to contain the naphtha, is shown as arranged sufficiently above the burners to insure a constant flow of the fluid from the hydrostatic pressure, the flow being regulated by a suitable stop-cock, B. From the reservoir the fluid passes down through the wick-tube C, which is filled with cotton-wick or some other suitable conducting material, to the vapor-tube D, being converted into vapor during its passage through the wick-tube, as hereinafter explained, and thence into the valves E, escaping through the jets e, the flow through the jets being regulated by the screw F. As the hot vapors or gases escape into the mixing chambers or cylinders G of the stove they are mingled with air, which rushes in at the bottom of the cylinder, as indicated by the blue arrows. The mixed air and vapor then ascend through a screen of wire gauze, H, upon the upper surface of which it is ignited, more air being admitted at this point by means of apertures I in the sides of the chimney J. The screen H serves both to divide the vapors more minutely, and thus facilitate its mixture with the air, and to prevent the flame from extending into the mixing-chamber. I have found, however, by experience, that even the quantity of air thus supplied was insufficient to consume the heavier grades of naphtha properly, for as the air only acted upon the outer surface of the cone of flame the vapor passing up through the central portion of the tube would escape unconsumed, owing to the deficiency in the quantity of oxygen thus supplied to it, and would thus cause the stove to smoke, and the articles prepared upon it to smell of the naphtha. Moreover, under certain circumstances, the vapor would become so much condensed from contact with the air as to cause it to rise very slowly, if at all, through the mixing-chamber, and thus impede the draft.

In order to overcome the first of these objections, I insert a metal tube, K, (of high conducting power and open at both ends) into the mixing-chamber G, its lower end extending below the bottom of the stove between the two valves E, as shown in Fig. 3, while its upper end extends up through the wire-gauze H to a point above the level of the wick-tube C, and between the horns of the crescent-shaped solid heater L, the heat from which vaporizes the fluid in the wick-tube. This tube thus acts as an Argand burner to convey oxygen into the very center of the cone, and thus insures the perfect combustion of the vapors. It performs, moreover, another very important function, for its upper portion, being surrounded by flame and by the horns of the heater, becomes very hot, and by conduction in turn heats the air passing up through both it and the cylinder. It likewise warms the valves and vapor-tube to some extent, and thus increases both the draft and the vaporizing qualities of the stove, as well as promoting the combustion of the vapors. I am also enabled by the use of this tube to enlarge the circumference of the flame and to supply it with the requisite quantity of oxygen, both internally and externally.

The advantages attained by my improvement will thus be evident, as it enables me to use naphtha of the heaviest kind, (having sufficient fluidity to volatilize,) which kind is cheaper, can be more readily procured, and be used with perfect safety, instead of requiring one to employ the lighter grades, in the use of which danger of explosion is unavoidable.

In the drawings the black arrows represent the course of the fluid, the yellow ones that of the vapor, the blue ones that of the air, and the red ones that of the mingled air and vapor. These arrows, together with the description, render the operation of the stove manifest.

What I claim as my invention, and desire to secure by Letters Patent, is—

1. The combination of the wick-tube, the vapor-tube, the valves, the wire gauze screen, and the heater-cap, with the central air-tube, substantially in the manner described, for the purposes set forth.

2. The central tube, K, combined with the outer tube, J, as set forth.

In testimony whereof I have hereunto subscribed my name.

JAMES S. GRAY.

Witnesses:
ALMON D. WEBB,
S. I. HUNT.